US012736652B2

(12) United States Patent
Kim

(10) Patent No.: US 12,736,652 B2
(45) Date of Patent: Sep. 15, 2026

(54) METHOD OF GENERATING RADAR SIGNAL AND COMPUTING DEVICE FOR PERFORMING THE METHOD

(71) Applicant: ELECTRONICS AND TELECOMMUNICATIONS RESEARCH INSTITUTE, Daejeon (KR)

(72) Inventor: Hyung Jung Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 168 days.

(21) Appl. No.: 18/792,223

(22) Filed: Aug. 1, 2024

(65) Prior Publication Data

US 2025/0172681 A1 May 29, 2025

(30) Foreign Application Priority Data

Nov. 29, 2023 (KR) ........................ 10-2023-0169900

(51) Int. Cl.
*G01S 13/28* (2006.01)
*G01S 7/04* (2006.01)
*G01S 7/40* (2006.01)

(52) U.S. Cl.
CPC ............ *G01S 13/288* (2013.01); *G01S 7/046* (2013.01); *G01S 7/4008* (2013.01)

(58) Field of Classification Search
CPC ...... G01S 13/288; G01S 7/046; G01S 7/4008; G01S 7/282; G01S 7/36
See application file for complete search history.

(56) References Cited

U.S. PATENT DOCUMENTS 7,375,676 B1 5/2008 Loberger
2014/0152489 A1 6/2014 Lee et al.
(Continued)

FOREIGN PATENT DOCUMENTS

CN 116953623 A * 10/2023 ............... G01S 7/28
KR 10-1019075 B1 3/2011
(Continued)

OTHER PUBLICATIONS

18792223_2026-04-07_CN_116953623_A_M.pdf, machine translation of CN-116953623-A (Year: 2023).*
(Continued)

*Primary Examiner* — William Kelleher
*Assistant Examiner* — Kenneth W Good

(57) ABSTRACT

A method of generating a radar signal is disclosed. The method includes generating a nonlinear frequency modulation (NLFM) waveform set composed of a plurality of NLFM waveforms, based on a target nonlinearity vector among a plurality of nonlinearity vectors, generating a target polyphase-code set composed of a plurality of polyphase-code sequences, based on an orthogonal phase, determining an orthogonal radar signal set composed of NLFM-based orthogonal radar signals using the NLFM waveform set generated based on the target nonlinearity vector and the target polyphase-code set, and redetermining the orthogonal radar signal set such that orthogonality is maximized by minimizing an objective function composed of an autocorrelation function of each orthogonal radar signal constituting the orthogonal radar signal set and a cross-correlation function between two arbitrary orthogonal radar signals constituting the orthogonal radar signal set.

19 Claims, 5 Drawing Sheets

(56) References Cited

U.S. PATENT DOCUMENTS

2016/0306039 A1* 10/2016 Selzler .................. G01S 13/288
2019/0346556 A1* 11/2019 Wang ...................... G01S 13/34
2021/0132211 A1* 5/2021 McCormick .......... G01S 13/538
2023/0074122 A1 3/2023 Kim et al.

FOREIGN PATENT DOCUMENTS

KR 10-2020-0085903 A 7/2020
KR 10-2023-0035830 A 3/2023
KR 10-2023-0079818 A 6/2023

OTHER PUBLICATIONS

Farhan A. Qazi et al., "Good Code Sets based on Piecewise Linear FM," IEEE, 2012.
Uttam Majumder et al., "Design and Analysis of Radar Waveforms Achieving Transmit and Receive Orthogonality," IEEE Transactions on Aerospace and Electronic Systems, Jun. 2016, vol. 52, No. 3.
Tianqu Liu et al., "Low Correlation Interference OFDM-NLFM Waveform Design for MIMO Radar Based on Alternating Optimization," Sensors, 2021.
Zhihuo Xu et al., "Nonlinear Frequency-Modulated Waveforms Modeling and Optimization for Radar Applications," Mathematics, 2022.

* cited by examiner

METHOD OF GENERATING RADAR SIGNAL AND COMPUTING DEVICE FOR PERFORMING THE METHOD

CROSS-REFERENCE TO RELATED APPLICATIONS

This application claims the benefit of Korean Patent Application No. 10-2023-0169900, filed on Nov. 29, 2023, in the Korean Intellectual Property Office, the entire disclosure of which is incorporated herein by reference for all purposes.

BACKGROUND

1. Field of the Invention

One or more embodiments relate to a method of generating a radar signal, and more particularly, to technology for generating an orthogonal radar signal to guarantee detection performance of radar while increasing frequency use efficiency.

2. Description of the Related Art

The conventional radar system uses a frequency channel without overlapping for each radar to eliminate radio interference between radars. However, due to wide bandwidth and increased demand for radar, available frequency resources have become scarce, and the need to increase frequency use efficiency through frequency sharing between radars has emerged.

Orthogonal signal waveform technology has been proposed for frequency sharing between radars. The representative technology is orthogonal phase modulation for radar frequency sharing technology. More specifically, the orthogonal phase modulation for radar frequency sharing is a method of assigning and transmitting signal waveforms containing different pieces of orthogonal codes for each radar and removing other radar signals by passing a reception signal through a self-code-based matched filter at a receiver. To apply the orthogonal phase modulation for radar frequency sharing, a pulse compression type of signal waveform is proposed in which each radar divides a pulse into several short sub-pulses, modulates each sub-pulse into phase modulation orthogonal code, and transmits the sub-pulse.

However, the orthogonal phase modulation for radar frequency sharing has excellent target distance detection performance but has a disadvantage of poor target speed detection performance.

Furthermore, orthogonal signal waveform technology for frequency sharing is being developed in frequency modulation for radar frequency sharing technology. More specifically, the frequency modulation for radar frequency sharing transmits different frequency modulation radar signal waveforms for each radar and obtains corresponding target signal information while reducing an interference signal generated by other radars, through a de-chirp signal processing process at the receiver. In this process, a technique has been proposed to reduce an interference signal from other radars at the receiver by varying various parameters (e.g., a chirp rate and a start frequency) of a chirp of a transmission signal waveform for each radar has been proposed.

However, the frequency modulation for radar frequency sharing has excellent target speed detection performance compared to phase modulation of code division signal technology but has a disadvantage of poor orthogonal performance between signals and poor orthogonal performance as the number of radars used at the same time increases.

SUMMARY

Embodiments provide a method of generating a radar signal that may guarantee detection performance while reducing interference caused by other radars in a radar system using a frequency modulated signal.

Embodiments provide a method of generating a radar signal in which orthogonality is maximized by an optimization framework that optimizes a nonlinear frequency modulation (NLFM) waveform.

However, the technical aspects are not limited to the aforementioned aspects, and other technical aspects may be present.

According to an aspect, there is provided a method of generating a radar signal including generating a nonlinear frequency modulation waveform set composed of a plurality of nonlinear frequency modulation waveforms based on a target nonlinearity vector among a plurality of nonlinearity vectors, generating a target polyphase-code set composed of a plurality of polyphase-code sequences based on an orthogonal phase, determining an orthogonal radar signal set composed of NLFM-based orthogonal radar signals using the NLFM waveform set generated based on the target nonlinearity vector and the target polyphase-code set, and redetermining the orthogonal radar signal set such that orthogonality is maximized by minimizing an objective function composed of an autocorrelation function of each orthogonal radar signal constituting the orthogonal radar signal set and a cross-correlation function between two arbitrary orthogonal radar signals constituting the orthogonal radar signal set.

The determining of the orthogonal radar signal set may include determining the orthogonal radar signal set by performing an element operation between the target polyphase-code set and the NLFM waveform set generated based on the target nonlinearity vector.

The redetermining of the orthogonal radar signal set may include calculating a first output of the objective function for the orthogonal radar signal set determined using the target nonlinearity vector and the target polyphase-code set, identifying a second output of the objective function for the orthogonal radar signal set determined using a previous nonlinearity vector and a previous polyphase-code set, selecting an optimal nonlinearity vector and an optimal polyphase-code set based on the calculated first output of the objective function and the identified second output of the objective function, and redetermining the orthogonal radar signal set through an NLFM waveform set generated based on the selected optimal nonlinearity vector and the selected optimal polyphase-code set.

The selecting of the optimal nonlinearity vector and the optimal polyphase-code set may include determining a current target nonlinearity vector and a current target polyphase-code set to be an optimal nonlinearity vector and an optimal polyphase-code set when the calculated first output of the objective function is less than the identified second output of the objective function.

The selecting of the optimal nonlinearity vector and the optimal polyphase-code set may include replacing a current target nonlinearity vector with another nonlinearity vector included in the plurality of nonlinearity vectors and replacing the plurality of polyphase-code sequences constituting the target polyphase-code set with another admissible phase set when the calculated first output of the objective function is greater than or equal to the identified second output of the objective function.

The redetermining of the orthogonal radar signal set may include redetermining the orthogonal radar signal set using a new NLFM waveform set generated through the other nonlinearity vector.

The redetermining of the orthogonal radar signal set may include redetermining the orthogonal radar signal set using a new polyphase-code set in which the plurality of polyphase-code sequences is replaced with the other admissible phase set.

According to another aspect, there is provided a method of generating a radar signal, the method including determining an orthogonal radar signal set including an NLFM-based orthogonal radar signals using a target polyphase-code set including a plurality of polyphase-code sequences and an NLFM waveform set including a plurality of NLFM waveforms, based on a target nonlinearity vector, determining an objective function including an autocorrelation function of each orthogonal radar signal of the orthogonal radar signal set and a cross-correlation function between two arbitrary orthogonal radar signals included in the orthogonal radar signal set, and determining whether to redetermine the orthogonal radar signal set in accordance with an output of the objective function for the two arbitrary orthogonal radar signals selected from the orthogonal radar signal set.

The determining of the orthogonal radar signal set may include determining the orthogonal radar signal set by performing an element operation between the target polyphase-code set and the NLFM waveform set generated based on the target nonlinearity vector.

The redetermining of the orthogonal radar signal set may include calculating a first output of the objective function for the orthogonal radar signal set determined using the target nonlinearity vector and the target polyphase-code set, identifying a second output of the objective function for the orthogonal radar signal set determined using a previous nonlinearity vector and a previous polyphase-code set, selecting an optimal nonlinearity vector and an optimal polyphase-code set based on the calculated first output of the objective function and the identified second output of the objective function, and redetermining the orthogonal radar signal set using an NLFM waveform set generated based on the selected optimal nonlinearity vector and the selected optimal polyphase-code set.

The selecting of the optimal nonlinearity vector and the optimal polyphase-code set may include determining a current target nonlinearity vector and a current target polyphase-code set to be an optimal nonlinearity vector and an optimal polyphase-code set when the calculated first output of the objective function is less than the identified second output of the objective function.

The selecting of the optimal nonlinearity vector and the optimal polyphase-code set may include replacing a current target nonlinearity vector with another nonlinearity vector included in the plurality of nonlinearity vectors and replacing the plurality of polyphase-code sequences constituting the target polyphase-code set with another admissible phase set when the calculated first output of the objective function is greater than or equal to the identified second output of the objective function.

According to still another aspect, there is provided a computing device including one or more processors and a memory configured to load or store a program executed by the one or more processors, in which the program includes instructions that cause the one or more processors to perform operations of generating an NLFM waveform set composed of a plurality of NLFM waveforms, based on a target nonlinearity vector among a plurality of nonlinearity vectors, generating a target polyphase-code set composed of a plurality of polyphase-code sequences, based on an orthogonal phase, determining an orthogonal radar signal set composes of NLFM-based orthogonal radar signals using the NLFM waveform set generated based on the target nonlinearity vector and the target polyphase-code set, and redetermining the orthogonal radar signal set such that orthogonality is maximized by minimizing an objective function composed of an autocorrelation function of each orthogonal radar signal constituting the orthogonal radar signal set and a cross-correlation function between two arbitrary orthogonal radar signals constituting the orthogonal radar signal set.

The one or more processors may be configured to determine the orthogonal radar signal set by performing an element operation between the target polyphase-code set and the NLFM waveform set generated based on the target nonlinearity vector.

The one or more processors may be configured to calculate a first output of the objective function for the orthogonal radar signal set determined using the target nonlinearity vector and the target polyphase-code set, identify a second output of the objective function for the orthogonal radar signal set determined through previous nonlinearity vector and a previous polyphase-code set, select an optimal nonlinearity vector and an optimal polyphase-code set based on the calculated first output of the objective function and the identified second output of the objective function, and redetermine the orthogonal radar signal set through an NLFM waveform set generated based on the selected optimal nonlinearity vector and the selected optimal polyphase-code set.

The one or more processors may be configured to determine a current target nonlinearity vector and a current target polyphase-code set to be an optimal nonlinearity vector and an optimal polyphase-code set when the calculated first output of the objective function is less than the identified second output of the objective function.

The one or more processors may be configured to replace a current target nonlinearity vector with another nonlinearity vector included in the plurality of nonlinearity vectors and configured to replace the plurality of polyphase-code sequences constituting the target polyphase-code set with another admissible phase set when the calculated first output of the objective function is greater than or equal to the identified second output of the objective function.

The one or more processors may be configured to redetermine the orthogonal radar signal set using a new NLFM waveform set generated through the other nonlinearity vector.

The one or more processors may be configured to redetermine the orthogonal radar signal set using a new polyphase-code set in which the plurality of polyphase-code sequences is replaced with the other admissible phase set.

Additional aspects of embodiments will be set forth in part in the description which follows and, in part, will be apparent from the description, or may be learned by practice of the disclosure.

According to embodiments, a method of generating a radar signal that may guarantee detection performance while reducing interference caused by other radars in a radar system using a frequency modulated signal that uses frequencies in the same band or adjacent band may be provided.

According to embodiments, a method of generating a radar signal in which orthogonality is maximized through an optimization framework that optimizes a nonlinear frequency modulation (NLFM) waveform may be provided.

According to embodiments, frequency use efficiency may be improved by sharing frequencies between radars using a radar signal with an NLFM waveform in which orthogonality is maximized.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
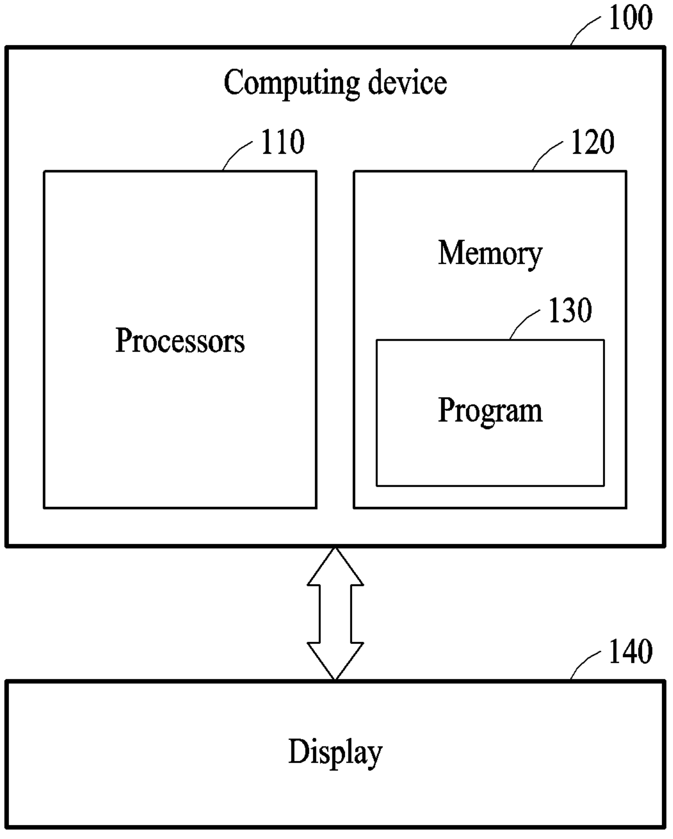
FIG. 1 is a diagram illustrating a configuration of a computing device, according to an embodiment.

The following detailed structural or functional description is provided as an example only and various alterations and modifications may be made to the embodiments. Accordingly, the embodiments are not construed as limited to the disclosure and should be understood to include all changes, equivalents, and replacements within the idea and the technical scope of the disclosure.

Although terms, such as first, second, and the like are used to describe various components, the components are not limited to the terms. These terms should be used only to distinguish one component from another component. For example, a first component may be referred to as a second component, or similarly, the second component may be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. As used herein, "A or B," "at least one of A and B," "at least one of A or B," "A, B or C," "at least one of A, B and C," and "at least one of A, B, or C," each of which may include any one of the items listed together in the corresponding one of the phrases, or all possible combinations thereof. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, should be construed to have meanings matching with contextual meanings in the relevant art, and are not to be construed to have an ideal or excessively formal meaning unless otherwise defined herein.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a diagram illustrating a configuration of a computing device, according to an embodiment.

As shown in FIG. 1, a computing device 100 may include one or more processors 110 and a memory 120 configured to load or store a program 130 executed by the one or more processors 110. The components included in the computing device 100 of FIG. 1 are only examples, and other generally used components may be further included in addition to the components illustrated in FIG. 1.

The one or more processors 110 may control the overall operation of each component of the computing device 100. The one or more processors 110 may include at least one of a central processing unit (CPU), a microprocessor unit (MPU), a microcontroller unit (MCU), a graphics processing unit (GPU), a neural processing unit (NPU), a digital signal processor (DSP), and other well-known types of processors in a relevant field of technology. In addition, the one or more processors 110 may perform an operation of at least one application or program to perform the methods and/or operations described herein according to embodiments. The computing device 100 may include the one or more processors 110.

The memory 120 may store one of or two or more combinations of various pieces of data, commands, and pieces of information that are used by the components (e.g., the one or more processors 110) included in the computing device 100. The memory 120 may include a volatile memory or a non-volatile memory.

The program 130 may include one or more actions through which the methods and/or operations described herein according to embodiments are implemented and may be stored in the memory 120 as software. In this case, the actions may correspond to a command that is implemented in the program 130. For example, the program 130 may include instructions that cause the one or more processors 110 to perform operations of generating a nonlinear frequency modulation (NLFM) waveform set composed of a plurality of NLFM waveforms, based on a target nonlinearity vector among a plurality of nonlinearity vectors, generating a target polyphase-code set composed of a plurality of polyphase-code sequences based on an orthogonal phase, determining an orthogonal radar signal set composed of NLFM-based orthogonal radar signals using the NLFM waveform set generated based on the target nonlinearity vector and the target polyphase-code set, and redetermining the orthogonal radar signal set such that orthogonality is maximized by minimizing an objective function composed of an autocorrelation function of each orthogonal radar signal constituting the orthogonal radar signal set and a cross-correlation function between two arbitrary orthogonal radar signals constituting the orthogonal radar signal set.

When the program 130 is loaded in the memory 120, the one or more processors 110 may execute a plurality of operations to implement the program 130 and perform the methods and/or operations described herein according to embodiments.

An execution screen of the program 130 may be displayed on a display 140. Although the display 140 is illustrated as being a separate device connected to the computing device 100 in FIG. 1, the display 140 may be included in the components of the computing device 100 when the computing device 100 is a smartphone, a tablet, or other terminals that are portable by a user. The execution screen displayed on the display 140 may be a state before information is input to the program 130 or may be an execution result of the program 130.

Figure 2:
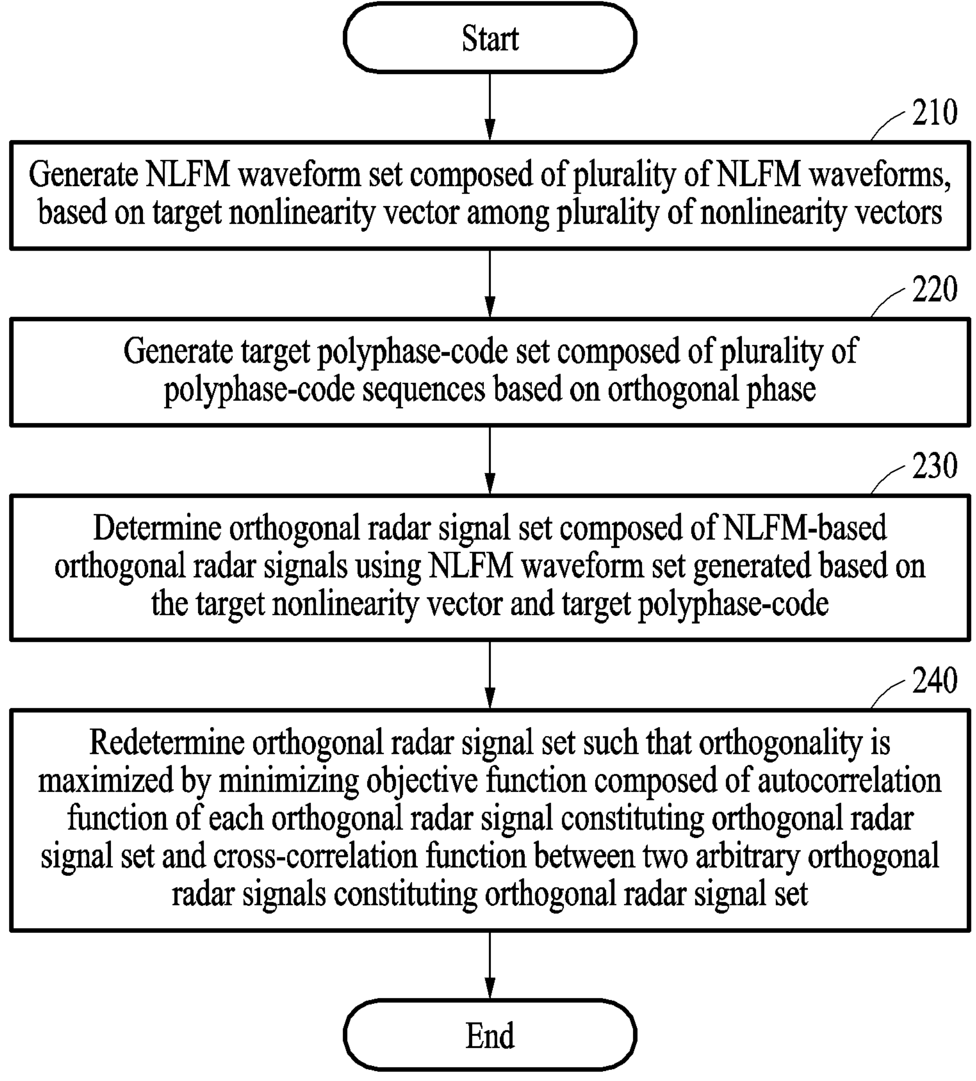
FIG. 2 is a flowchart illustrating a radar signal generation method according to an embodiment.

FIG. 2 is a flowchart illustrating a radar signal generation method according to an embodiment.

The radar signal generation method shown in FIG. 2 may be performed by the one or more processors 110 of the computing device 100 shown in FIG. 1. In operation 210, the one or more processors 110 may generate an NLFM waveform set composed of a plurality of NLFM waveforms, based on a target nonlinearity vector among a plurality of nonlinearity vectors. The NLFM waveform may be used in a radar system that requires a lower sidelobe peak than a linear frequency modulation (LFM) waveform.

Figure 3:
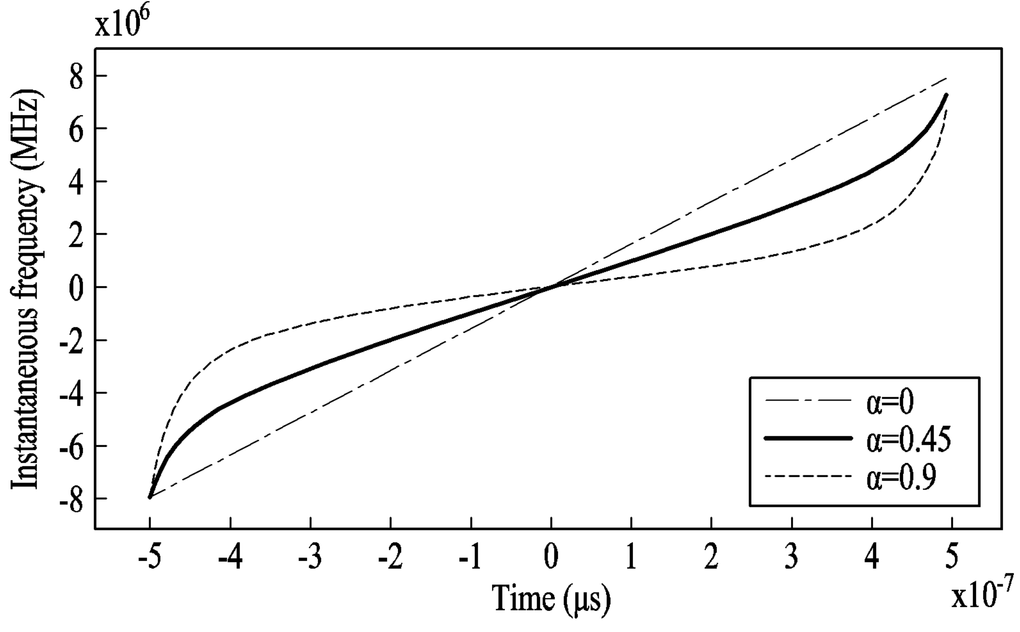
FIG. 3 is a diagram illustrating an instantaneous frequency of a nonlinear frequency modulation (NLFM) waveform, according to an embodiment.

This NLFM waveform may be obtained by nonlinearly modifying an instantaneous frequency according to time, as shown in FIG. 3. Here, the NLFM waveform may have different degrees of sidelobe peak depending on a value of a nonlinear parameter $\alpha$ representing a degree of nonlinearity.

Figure 4:
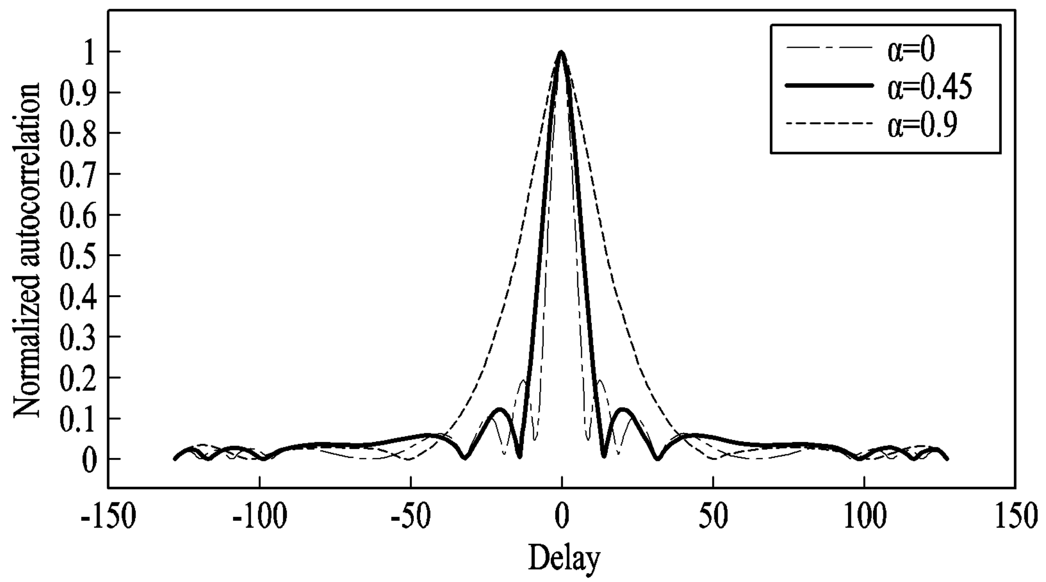
FIG. 4 is a diagram illustrating an autocorrelation function of an NLFM waveform, according to an embodiment.

More specifically, referring to FIG. 4, when a value of the nonlinear parameter $\alpha$ is 0, a radar signal may correspond to an LFM waveform. In contrast, as a value of the nonlinear parameter $\alpha$ is closer to 1, the nonlinearity of an NLFM waveform may increase, and as a value of the nonlinear parameter $\alpha$ increases, an autocorrelation sidelobe peak may decrease.

That is, an NLFM waveform x(t) is a signal of which a frequency is nonlinearly up-chirping or down-chirping according to time and may be expressed as Equation 1 below.

$$x(t) = \exp\left[j2\pi\left(f_0 t + \frac{1}{2}\alpha t \cdot t\right)\right] \cdot 1_{[0,T_p]}(t) \qquad \text{[Equation 1]}$$

$$\alpha t = \frac{BW}{2}\left[\frac{\alpha \tan(2\gamma t/T_p)}{\tan\gamma} - \frac{2(1-\alpha)t}{T_p}\right]$$

Here, $T_p$, $f_0$, BW, and $\gamma$ denote a pulse width, a starting frequency, a chirp bandwidth, and a constant, respectively. In addition, $1_{[0,T_p]}(t)$ denotes an indicator function and may be expressed as Equation 2 below.

$$1_{[0,T]}(t) = \begin{cases} 1, & 0 \le t \le T \\ 0, & \text{otherwise} \end{cases} \qquad \text{[Equation 2]}$$

The method of generating such an NLFM waveform is not limited to the method according to the above equation and may be applied to any method that may generate an NLFM waveform.

Furthermore, when the start frequency $f_0$ is 0, the one or more processors 110 may simplify and express the NLFM waveform x(t) as shown in Equation 3 below.

$$x(t) = \exp\left[j2\pi\left(\frac{1}{2}\alpha t \cdot t\right)\right] \cdot 1_{[0,T_p]}(t) \qquad \text{[Equation 3]}$$

An NLFM waveform set x provided herein may include a set of L NLFM waveforms and may be defined as Equation 4 below.

$$X = [x_0(t), x_1(t), \ldots, x_{L-1}(t)]^T \qquad \text{[Equation 4]}$$

Here, $V^T$ denotes a transpose of a vector V.

In operation 220, the one or more processors 110 may generate a target polyphase-code set composed of a plurality of polyphase-code sequences based on an orthogonal phase. The present disclosure may provide a radar signal with excellent orthogonal performance through the polyphase-code sequences.

For example, when a polyphase-code set includes L polyphase-code sequences and each polyphase-code sequence includes N sub-pulses, a polyphase-code set S may be expressed as Equation 5 below.

$$S = [s_0, s_1, \ldots, s_{L-1}] \qquad \text{[Equation 5]}$$

Here, $s_l$ denotes an l-th polyphase-code sequence and may be expressed as Equation 6 below.

$$s_l = [s_l(0), s_l(1), \ldots, s_l(N-1)] \qquad \text{[Equation 6]}$$

$$\{s_l(n) = \exp[\phi_l(n)],\ n = 0, 1, \ldots, N-1\},\ l = 0, 1, \ldots, L-1$$

Here, $s_l(n)$ denotes an n-th sub-pulse of $s_l$ and $\phi_l(n)(0 \le \phi_l(n) \le 2\pi)$ denotes a phase value of $s_l(n)$.

The n-th sub-pulse $s_l(n)$ of the l-th polyphase-code sequence $s_l$ may be used to encode an n-th element of a coded waveform l.

Here, $\phi_l(n)$ may be selected from among admissible phase values provided in Equation 7 below.

$$\phi_l(n) \in \left\{0, \frac{2\pi}{M}, 2\cdot\frac{2\pi}{M}, \ldots, (M-1)\cdot\frac{2\pi}{M}\right\} \qquad \text{[Equation 7]}$$

Here, M denotes the number of distinct phases that polyphase code has.

In operation 230, the one or more processors 110 may determine an orthogonal radar signal set composed of NLFM-based orthogonal radar signals using the NLFM waveform set generated based on the target nonlinearity vector and the target polyphase-code set.

More specifically, an l-th NLFM-based orthogonal radar signal $y_l(t)$ may be expressed by multiplying an l-th NLFM waveform $x_l(t)$ by an l-th polyphase-code sequence $s_l$, as shown in Equation 8 below.

$$y_l(t) = x_l(t) \cdot \sum_{n=0}^{N-1} P(t - nT_c) \cdot s_l(n) \qquad \text{[Equation 8]}$$

$$= \sum_{n=0}^{N-1} \exp\left[j2\pi\left(\frac{1}{2}\alpha_l t \cdot t\right)\right] \cdot P(t - nT_c) \cdot e^{j\phi_l(n)}$$

Here, $T_c$ and P(t) denote a chip time and a square pulse, respectively, and Equation 8 above may be defined as Equation 9 below.

$$y_l(t) = x_l(t) \odot s_l. \quad \text{[Equation 9]}$$

Here, ⊙ denotes an element operation.

Accordingly, an orthogonal radar signal set Y consist of L NLFM-based orthogonal radar signals may be expressed as Equation 10 below.

$$\begin{aligned} Y &= [y_0(t), y_1(t), \ldots, y_{L-1}(t)] \\ &= X \circ S \end{aligned} \quad \text{[Equation 10]}$$

Here, X∘S denotes an element operation between X and S.

In operation 240, the one or more processors 110 may redetermine an orthogonal radar signal set such that orthogonality is maximized by minimizing an objective function composed of an autocorrelation function of each orthogonal radar signal constituting the orthogonal radar signal set and a cross-correlation function between two arbitrary orthogonal radar signals constituting the orthogonal radar signal set.

More specifically, a parameter of the orthogonal radar signal may be expressed as a nonlinearity vector α and a phase matrix S(L, M, N), as shown in Equation 11 below.

$$\alpha = [\alpha_1 \ \ \alpha_2 \ \ \ldots \ \ \alpha_L]^T \quad \text{[Equation 11]}$$

$$S(L, M, N) = \begin{bmatrix} \phi_1(1) & \phi_1(2) & \ldots & \phi_1(N) \\ \phi_2(1) & \phi_2(2) & \ldots & \phi_2(N) \\ & & \ldots & \\ \phi_L(1) & \phi_L(2) & \ldots & \phi_L(N) \end{bmatrix}$$

Here, L, M, and N denote the number of polyphase-code sequences, the number of distinct phases that polyphase code has, and a code length of a polyphase-code sequence, respectively. Here, $\emptyset_1(n)$ denotes a phase of an n-th subpulse of an l-th polyphase-code sequence and may be selected from values provided in Equation 12 below.

$$\phi_1(n) \in [0, 1, 2, \ldots, M-1] \quad \text{[Equation 12]}$$

Accordingly, when the nonlinearity vector α and the phase matrix S(L, M, N) are defined, an l-th NLFM-based orthogonal radar signal $y_l(t)$ may be expressed as Equation 13 below.

$$y_l(t) = x_l(\alpha_l, t) \cdot \exp(j2\pi \cdot s_l(n)/M) \quad \text{[Equation 13]}$$

Here, $x_l(\alpha_l, t)$ denotes an NLFM waveform having nonlinearity with a value of Furthermore, when the orthogonal radar signal set is Y, Obj(Y) denotes an objective function expressed as a weighted sum of an autocorrelation sidelobe peak ASP of each orthogonal radar signal and a cross-correlation peak CP between two arbitrary orthogonal radar signals may be expressed as Equation 14 below.

$$Obj(Y) = (1-\lambda)ASP(Y) + \lambda \cdot CP(Y) \quad \text{[Equation 14]}$$

Here, the autocorrelation peak ASP and the cross-correlation peak CP may be expressed as Equation 15 below.

$$ASP(Y) = \max_i \left\{ \max_{k \neq 0} \lceil R_{ii}(k) \rceil^2 \right\} \quad \text{[Equation 15]}$$

$$CP(Y) = \max_{i,j,i \neq j} \left\{ \max_k \lceil R_{ij}(k) \rceil^2 \right\}$$

Here, $R_{ij}(k)$ denotes a correlation function and may be expressed as Equation 16 below.

$$R_{ij}(k) = \sum_{n=-\infty}^{k} y_i(n) \cdot y_j^*(n-k) \quad \text{[Equation 16]}$$

Furthermore, the one or more processors 110 may calculate a first output of the objective function Obj(Y) for the orthogonal radar signal set Y determined through a target nonlinearity vector and a target polyphase-code set and may identify a second output of an objective function for an orthogonal radar signal set determined through a previous nonlinearity vector and a previous polyphase-code set.

The one or more processors 110 may adopt an optimal nonlinearity vector and an optimal polyphase-code set based on the calculated first output of the objective function and the identified second output of the objective function described above.

More specifically, the one or more processors 110 may determine a current target nonlinearity vector and a current target polyphase-code set to be an optimal nonlinearity vector and an optimal polyphase-code set when the calculated first output of the objective function is less than the identified second output of the objective function.

Figure 5:
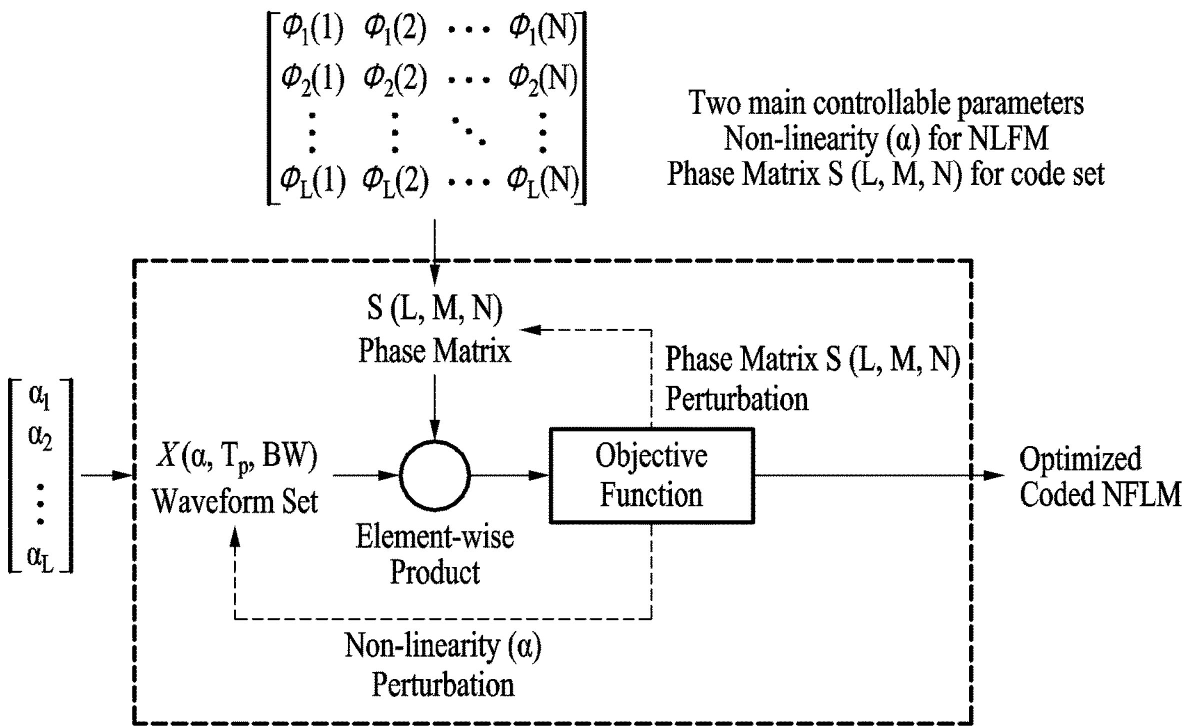
FIG. 5 is a diagram illustrating an algorithm structure to obtain an optimal orthogonal radar signal set, according to an embodiment.

In contrast, as shown in FIG. 5, when the calculated first output of the objective function is greater than or equal to the identified second output of the objective function, the one or more processors 110 may generate a new NLFM waveform set X' by replacing a current target nonlinearity vector α with another nonlinearity vector included in a plurality of nonlinearity vectors. The one or more processors 110 may redetermine a new orthogonal radar signal set Y' by multiplying the new NLFM waveform set X' described above by a phase matrix S(L, M, N).

Alternatively, as shown in FIG. 5, when the calculated first output of the objective function is greater than or equal to the identified second output of the objective function, the one or more processors 110 may generate a new phase matrix S'(L, M, N) by replacing a plurality of polyphase-code sequences constituting a target polyphase-code set S with another admissible phase set. The one or more processors 110 may redetermine a new orthogonal radar signal set Y' by multiplying the new phase matrix S'(L, M, N) described above by an NLFM waveform set X.

Alternatively, as shown in FIG. 5, the one or more processors 110 may simultaneously generate the new NLFM waveform set X' and the new phase matrix S'(L, M, N) and may redetermine the new orthogonal radar signal set Y' by multiplying the new NLFM waveform set X' by the new phase matrix S'(L, M, N).

The one or more processors 110 may redetermine the new orthogonal radar signal set Y' as described above until a stop condition is satisfied, and through this, may obtain a value of an optimal orthogonal radar signal set $Y_{opt}$ that maximizes orthogonality, as shown in Equation 17 below.

$$Y_{opt} = \underset{Y}{\operatorname{argmin}} Obj(Y) \qquad \text{[Equation 17]}$$

More specifically, although the new orthogonal radar signal set Y' is redetermined by a preset number of times, the one or more processors 110 may determine an orthogonal radar signal set determined through a current nonlinearity vector and a current polyphase-code set to be the optimal orthogonal radar signal set $Y_{opt}$ when a variation between the calculated first output of the object function and the identified second output of the object function is less than a predetermined reference.

For example, when a value of a standard deviation obtained by calculating a standard deviation of outputs of an object function calculated in response to a preset number of times is less than $10^{-3}$, the one or more processors 110 may determine an orthogonal radar signal set determined through a current nonlinearity vector and a current polyphase-code set to be the optimal orthogonal radar signal set $Y_{opt}$.

The components described in the embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

The embodiments described herein may be implemented using a hardware component, a software component, and/or a combination thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and/or multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be stored in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs and/or DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described hardware devices may be configured to act as one or more software modules in order to perform the operations of the above-described embodiments, or vice versa.

As described above, although the embodiments have been described with reference to the limited drawings, a person skilled in the art may apply various technical modifications and variations based thereon. For example, suitable results may be achieved if the described techniques are performed in a different order, and/or if components in a described system, architecture, device, or circuit are combined in a different manner, or replaced or supplemented by other components or their equivalents.

Accordingly, other implementations are within the scope of the following claims.

What is claimed is:

1. A method of generating a radar signal, the method comprising:

generating a nonlinear frequency modulation (NLFM) waveform set composed of a plurality of NLFM waveforms, based on a target nonlinearity vector among a plurality of nonlinearity vectors;

generating a target polyphase-code set composed of a plurality of polyphase-code sequences based on an orthogonal phase;

determining an orthogonal radar signal set composed of NLFM-based orthogonal radar signals using the NLFM waveform set generated based on the target nonlinearity vector and the target polyphase-code; and redetermining the orthogonal radar signal set such that orthogonality is maximized by minimizing an objective function composed of an autocorrelation function of each orthogonal radar signal constituting the orthogonal radar signal set and a cross-correlation function between two arbitrary orthogonal radar signals constituting the orthogonal radar signal set.

2. The method of claim 1, wherein the determining of the orthogonal radar signal set comprises determining the orthogonal radar signal set by performing an element operation between the target polyphase-code set and the NLFM waveform set generated based on the target nonlinearity vector.

3. The method of claim 1, wherein the redetermining of the orthogonal radar signal set comprises:

calculating a first output of the objective function for the orthogonal radar signal set determined using the target nonlinearity vector and the target polyphase-code set;

identifying a second output of the objective function for the orthogonal radar signal set determined using a previous nonlinearity vector and a previous polyphase-code set;

selecting an optimal nonlinearity vector and an optimal polyphase-code set based on the calculated first output of the objective function and the identified second output of the objective function; and redetermining the orthogonal radar signal set using an NLFM waveform set generated based on the selected optimal nonlinearity vector and the selected optimal polyphase-code set.

4. The method of claim 3, wherein the selecting of the optimal nonlinearity vector and the optimal polyphase-code set comprises determining a current target nonlinearity vector and a current target polyphase-code set to be an optimal nonlinearity vector and an optimal polyphase-code set when the calculated first output of the objective function is less than the identified second output of the objective function.

5. The method of claim 3, wherein the selecting of the optimal nonlinearity vector and the optimal polyphase-code set comprises replacing a current target nonlinearity vector with another nonlinearity vector comprised in the plurality of nonlinearity vectors and replacing the plurality of polyphase-code sequences constituting the target polyphase-code set with another admissible phase set when the calculated first output of the objective function is greater than or equal to the identified second output of the objective function.

6. The method of claim 5, wherein the redetermining of the orthogonal radar signal set comprises redetermining the orthogonal radar signal set using a new NLFM waveform set generated through the other nonlinearity vector.

7. The method of claim 5, wherein the redetermining of the orthogonal radar signal set comprises redetermining the orthogonal radar signal set using a new polyphase-code set in which the plurality of polyphase-code sequences is replaced with the other admissible phase set.

8. A method of generating a radar signal, the method comprising:

determining an orthogonal radar signal set comprising nonlinear frequency modulation (NLFM)-based orthogonal radar signals using a target polyphase-code set comprising a plurality of polyphase-code sequences and an NLFM waveform set comprising a plurality of NLFM waveforms, based on a target nonlinearity vector;

determining an objective function comprising an autocorrelation function of each orthogonal radar signal of the orthogonal radar signal set and a cross-correlation function between two arbitrary orthogonal radar signals included in the orthogonal radar signal set; and determining whether to redetermine the orthogonal radar signal set in accordance with an output of the objective function for the two arbitrary orthogonal radar signals selected from the orthogonal radar signal set.

9. The method of claim 8, wherein the determining of the orthogonal radar signal set comprises determining the orthogonal radar signal set by performing an element operation between the target polyphase-code set and the NLFM waveform set generated based on the target nonlinearity vector.

10. The method of claim 8, wherein the determining of whether to redetermine the orthogonal radar signal set comprises:

calculating a first output of the objective function for the orthogonal radar signal set determined using the target nonlinearity vector and the target polyphase-code set;

identifying a second output of the objective function for the orthogonal radar signal set determined using a previous nonlinearity vector and a previous polyphase-code set;

selecting an optimal nonlinearity vector and an optimal polyphase-code set based on the calculated first output of the objective function and the identified second output of the objective function; and redetermining the orthogonal radar signal set using an NLFM waveform set generated based on the selected optimal nonlinearity vector and the selected optimal polyphase-code set.

11. The method of claim 10, wherein the selecting of the optimal nonlinearity vector and the optimal polyphase-code set comprises determining a current target nonlinearity vector and a current target polyphase-code set to be an optimal nonlinearity vector and an optimal polyphase-code set when the calculated first output of the objective function is less than the identified second output of the objective function.

12. The method of claim 10, wherein the selecting of the optimal nonlinearity vector and the optimal polyphase-code set comprises replacing a current target nonlinearity vector with another nonlinearity vector comprised in a plurality of nonlinearity vectors and replacing the plurality of polyphase-code sequences constituting the target polyphase-code set with another admissible phase set when the calculated first output of the objective function is greater than or equal to the identified second output of the objective function.

13. A computing device comprising:

one or more processors; and a memory configured to load or store a program executed by the one or more processors, wherein the program comprises instructions that cause the one or more processors to perform operations of generating a nonlinear frequency modulation (NLFM) waveform set composed of a plurality of NLFM waveforms, based on a target nonlinearity vector among a plurality of nonlinearity vectors, generating a target polyphase-code set composed of a plurality of polyphase-code sequences based on an orthogonal phase, determining an orthogonal radar signal set composed of NLFM-based orthogonal radar signals using the NLFM waveform set generated based on the target nonlinearity vector and the target polyphase-code set, and redetermining the orthogonal radar signal set such that orthogonality is maximized by minimizing an objective function composed of an autocorrelation function of each orthogonal radar signal constituting the orthogonal radar signal set and a cross-correlation function between two arbitrary orthogonal radar signals constituting the orthogonal radar signal set.

14. The computing device of claim 13, wherein the one or more processors are configured to determine the orthogonal radar signal set by performing an element operation between the target polyphase-code set and the NLFM waveform set generated based on the target nonlinearity vector.

15. The computing device of claim 13, wherein the one or more processors are configured to calculate a first output of the objective function for the orthogonal radar signal set determined using the target nonlinearity vector and the target polyphase-code set, identify a second output of the objective function for the orthogonal radar signal set determined through a previous nonlinearity vector and a previous polyphase-code set, select an optimal nonlinearity vector and an optimal polyphase-code set based on the calculated first output of the objective function and the identified second output of the objective function, and redetermine the orthogonal radar signal set through an NLFM waveform set generated based on the selected optimal nonlinearity vector and the selected optimal polyphase-code set.

16. The computing device of claim 15, wherein the one or more processors are configured to determine a current target nonlinearity vector and a current target polyphase-code set to be an optimal nonlinearity vector and an optimal polyphase-code set when the calculated first output of the objective function is less than the identified second output of the objective function.

17. The computing device of claim 15, wherein the one or more processors are configured to replace a current target nonlinearity vector with another nonlinearity vector comprised in the plurality of nonlinearity vectors and configured to replace the plurality of polyphase-code sequences constituting the target polyphase-code set with another admissible phase set when the calculated first output of the objective function is greater than or equal to the identified second output of the objective function.

18. The computing device of claim 17, wherein the one or more processors are configured to redetermine the orthogonal radar signal set using a new NLFM waveform set generated through the other nonlinearity vector.

19. The computing device of claim 17, wherein the one or more processors are configured to redetermine the orthogonal radar signal set using a new polyphase-code set in which the plurality of polyphase-code sequences is replaced with the other admissible phase set.

* * * * *